United States Patent
Gutierrez et al.

(10) Patent No.: US 10,406,744 B2
(45) Date of Patent: Sep. 10, 2019

(54) GENERATING THREE-DIMENSIONAL OBJECTS

(71) Applicant: HEWLETT-PACKARD DEVELOPMENT COMPANY, L.P., Houston, TX (US)

(72) Inventors: Bernardo A. Gutierrez, San Diego, CA (US); Jacob T. Wright, San Diego, CA (US); Michael A. Novick, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 39 days.

(21) Appl. No.: 15/545,143

(22) PCT Filed: Mar. 5, 2015

(86) PCT No.: PCT/US2015/018866
§ 371 (c)(1),
(2) Date: Jul. 20, 2017

(87) PCT Pub. No.: WO2016/140670
PCT Pub. Date: Sep. 9, 2016

(65) Prior Publication Data
US 2018/0009157 A1    Jan. 11, 2018

(51) Int. Cl.
*B29C 64/10* (2017.01)
*B33Y 10/00* (2015.01)
(Continued)

(52) U.S. Cl.
CPC ............ *B29C 64/10* (2017.08); *B29C 64/165* (2017.08); *B29C 64/386* (2017.08); *B33Y 10/00* (2014.12); *B33Y 30/00* (2014.12); *B33Y 50/02* (2014.12)

(58) Field of Classification Search
CPC ..... B29C 64/10; B29C 64/386; B29C 64/165; B33Y 10/00; B33Y 30/00; B33Y 50/02
See application file for complete search history.

(56) References Cited

U.S. PATENT DOCUMENTS

| | | | | |
|---|---|---|---|---|
| 6,035,014 A | * | 3/2000 | Hiraoglu | G06K 9/00771 378/15 |
| 6,117,600 A | * | 9/2000 | Nakasuji | G03F 7/2037 430/296 |

(Continued)

FOREIGN PATENT DOCUMENTS

CN        104385592        3/2015

OTHER PUBLICATIONS

Cho, W., et al; "Methods for Distributed Design and Fabrication of Parts With Local Composition Control"; Oct. 19, 2000; http://web.mit.edu/~tdp/www/info-flow/publications/nsf00-conf.pdf.

*Primary Examiner* — Thomas C Lee
*Assistant Examiner* — Michael Tang
(74) *Attorney, Agent, or Firm* — HP Inc. Patent Department (57) ABSTRACT

At least one agent distributor may be to selectively deliver coalescing agent onto portions of a layer of build material at a first density and at a second density lower than the first density. A controller may be to control the at least one agent distributor to selectively deliver the coalescing agent at the first and second densities onto respective first and second portions of the layer in respective first and second patterns derived from data representing the three-dimensional object to be generated, so that when energy is applied to the layer the build material may coalesce and solidify to form a slice of the three-dimensional object in accordance with the first pattern. The second portion may be in proximity to a boundary of the first portion. Presence of the coalescing (Continued)

agent in the second portion may be to prevent at least some heat from flowing away from the first portion when the energy is applied.

20 Claims, 4 Drawing Sheets

(51) Int. Cl.
*B33Y 50/02* (2015.01)
*B33Y 30/00* (2015.01)
*B29C 64/386* (2017.01)
*B29C 64/165* (2017.01)

(56) References Cited

U.S. PATENT DOCUMENTS

| | | |
|---|---|---|
| 7,497,977 B2 | 3/2009 | Nielsen et al. |
| 8,535,036 B2 | 9/2013 | Hopkinson et al. |
| 8,741,194 B1* | 6/2014 | Ederer .................. B22C 9/00 264/113 |
| 2002/0079601 A1* | 6/2002 | Russell ................. B29C 41/12 264/40.1 |
| 2002/0145213 A1* | 10/2002 | Liu ..................... G03G 15/224 264/40.1 |
| 2005/0053798 A1 | 3/2005 | Maekawa |
| 2005/0211985 A1* | 9/2005 | Chin-Lung ....... H01L 29/66757 257/72 |
| 2006/0180957 A1* | 8/2006 | Hopkinson ............ B29C 67/02 264/405 |
| 2007/0238056 A1 | 10/2007 | Baumann |
| 2008/0122141 A1 | 5/2008 | Bedal |
| 2012/0201960 A1 | 8/2012 | Hartmann |
| 2014/0072823 A1 | 3/2014 | Hertter |
| 2014/0271328 A1* | 9/2014 | Burris ................. B23K 26/034 419/53 |
| 2014/0271961 A1 | 9/2014 | Khoshnevis |
| 2017/0345135 A1* | 11/2017 | Xu ........................ G06T 5/005 |

\* cited by examiner

GENERATING THREE-DIMENSIONAL OBJECTS

BACKGROUND

Additive manufacturing systems that generate three-dimensional objects on a layer-by-layer basis have been proposed as a potentially convenient way to produce three-dimensional objects. The quality of objects produced by such systems may vary widely depending on the type of additive manufacturing technology used.

BRIEF DESCRIPTION

Some examples are described with respect to the following figures.

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

Some additive manufacturing systems generate three-dimensional objects through the solidification of portions of successive layers of build material, such as a powdered or liquid build material. The properties of generated objects may be dependent on the type of build material and the type of solidification mechanism used. In some examples, solidification may be achieved using a liquid binder agent to chemically solidify build material. In other examples, solidification may be achieved by temporary application of energy to the build material. This may, for example, involve use of a coalescing agent, which is a material that, when a suitable amount of energy is applied to a combination of build material and coalescing agent, may cause the build material to coalesce and solidify. For example, the coalescing agent may act as an absorber of applied energy such that the portions of build material having coalescing agent experience coalescence and solidification. In some examples, a multiple agent additive manufacturing system may be used such as that described in PCT Application No. PCT/EP2014/050841 filed on Jan. 16, 2014, entitled "GENERATING A THREE-DIMENSIONAL OBJECT", the entire contents of which are hereby incorporated herein by reference. For example, in addition to selectively delivering coalescing agent to layers build material, coalescence modifier agent may also be selectively delivered to layers of build material. A coalescence modifier agent may serve to modify the degree of coalescence of a portion of build material on which the coalescence modifier agent has been delivered or has penetrated. In yet other examples, other methods of solidification may be used, for example selective laser sintering (SLS), light polymerization, among others. The examples described herein may be used with any of the above additive manufacturing systems and suitable adaptations thereof.

In examples in which solidification is achieved using coalescing agent and application of energy, energy absorbed by build material on which coalescing agent has been delivered or has penetrated to form the object may also partially propagate away from the object being generated and into surrounding build material on which coalescing agent has not been delivered and in which solidification is not intended. This effect may be exacerbated when using build materials that may have relatively high heat conductivity, as this may cause prevent formation of a heat reservoir beneath the surface of each newly created layer as it is formed. The heat in the reservoir may then propagate away from the object being generated, e.g. laterally across the build material, below the newest layer, and/or into a future layer once it is applied on the newest layer.

Thus, the object being generated may receive less heat than intended and therefore experience a lesser degree of coalescence and solidification than intended, e.g. may not completely coalesce and solidify as intended, resulting in poor object properties, such as poor surface properties, accuracy, strength, or inter-layer bonding. In some examples, thin portions of the object being generated may be especially at risk for under-solidification as heat may propagate away from the thin portions. This may cause the thin portions to be incompletely formed and may even cause these thin portions to break off after the object is generated.

Accordingly, the present disclosure provides various examples that may e.g. result in objects with good object properties, including good surface properties, accuracy, strength, and inter-layer bonding. For example, thin portions of objects may accurately form and may not break off. This may, for example, be achieved by providing coalescing agent at a first density in a first portion that is to be solidified, and a coalescing agent at a second density less than the first density in a second portion surrounding the first portion, e.g. surrounding a thin portion of the first portion. The second density may allow the second portion to heat up such that it may prevent heat from flowing away from the first portion (e.g. thin portion), but may not be high enough to allow the second portion to achieve full solidification.

Figure 1A:
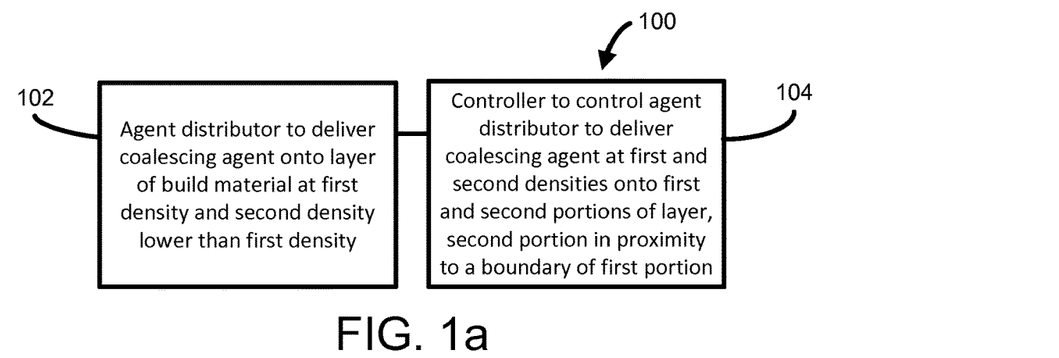
FIG. 1a illustrates a system for generating a three-dimensional object according to some examples.

FIG. 1a is a block diagram illustrating a system 100 for generating a three-dimensional object according to some examples. The system 100 may include at least one agent distributor 102 to selectively deliver coalescing agent onto portions of a layer of build material at a first density and at a second density lower than the first density. The system 100 may include a controller 104 to control the at least one agent distributor to selectively deliver the coalescing agent at the first and second densities onto respective first and second portions of the layer in respective first and second patterns derived from data representing the three-dimensional object to be generated, so that when energy is applied to the layer the build material may coalesce and solidify to form a slice of the three-dimensional object in accordance with the first pattern. The second portion may be in proximity to a boundary of the first portion. Presence of the coalescing agent in the second portion may be to prevent at least some heat from flowing away from the first portion when the energy is applied.

Figure 1B:
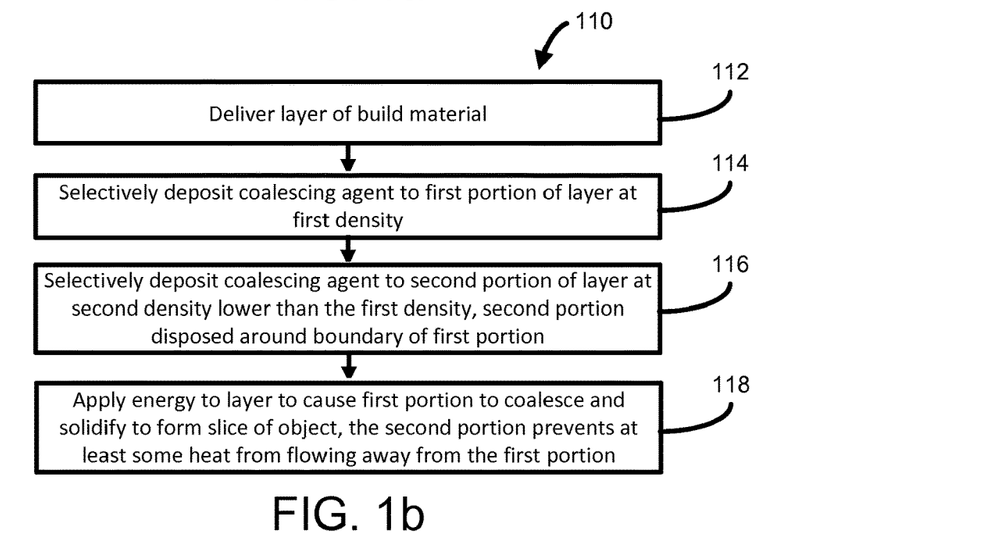
FIG. 1b is a flow diagram illustrating a method according to some examples.

FIG. 1b is a flow diagram illustrating a method 110 according to some examples. At 112, a layer of build material may be delivered. At 114, coalescing agent may be selectively deposited to a first portion of the layer at a first density. At 116, coalescing agent may be selectively deposited to a second portion of the layer at a second density lower than the first density. The second portion may be disposed around a boundary of the first portion. At 118, energy may be applied to the layer to cause the first portion to coalesce and solidify to form a slice of a three-dimensional object. Presence of coalescing agent in the second portion may prevent at least some heat from flowing away from the first portion.

Figure 1C:
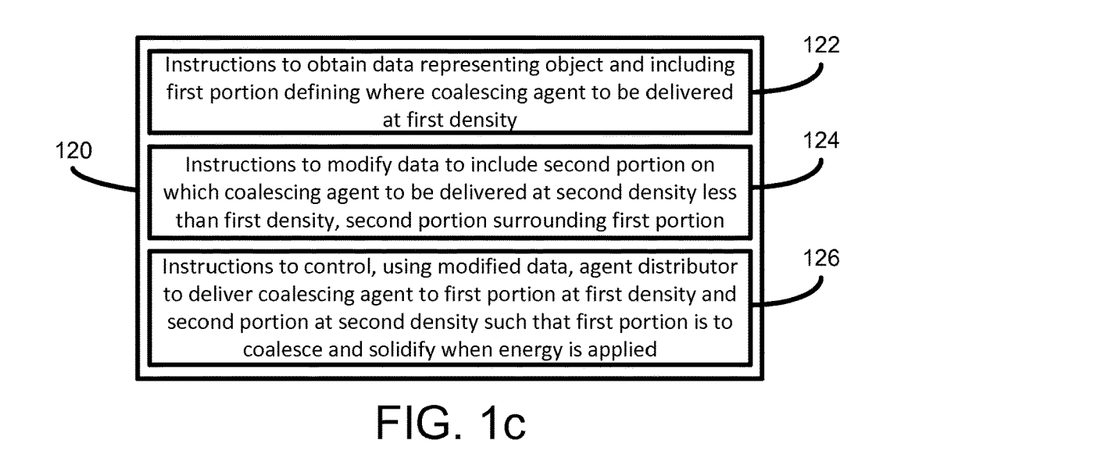
FIG. 1c is a block diagram illustrating a non-transitory computer readable storage medium (CRM) according to some examples.

FIG. 1c is a block diagram illustrating a non-transitory computer readable storage medium (CRM) 120 according to some examples. The medium 120 may include instructions 122 that when executed by a processor, cause the processor to obtain data representing a three-dimensional object to be generated. The data may include a first portion defining where coalescing agent is to be delivered at a first density. The medium 120 may include instructions 124 that when executed by a processor, cause the processor to modify the data to include a second portion on which coalescing agent is to be delivered at a second density less than the first density. The second portion may surround at least part of the first portion. The medium 120 may include instructions 126 that when executed by a processor, cause the processor to control, using the modified data, at least one agent distributor to deliver the coalescing agent to the first portion at a first density and to the second portion at a second density such that the first portion is to coalesce and solidify when energy is applied. The second density may be insufficient to achieve full solidification in the second portion when the energy is applied. Presence of the coalescing agent in the second portion may be to prevent heat from flowing away from the first portion when the energy is applied.

Figure 2:
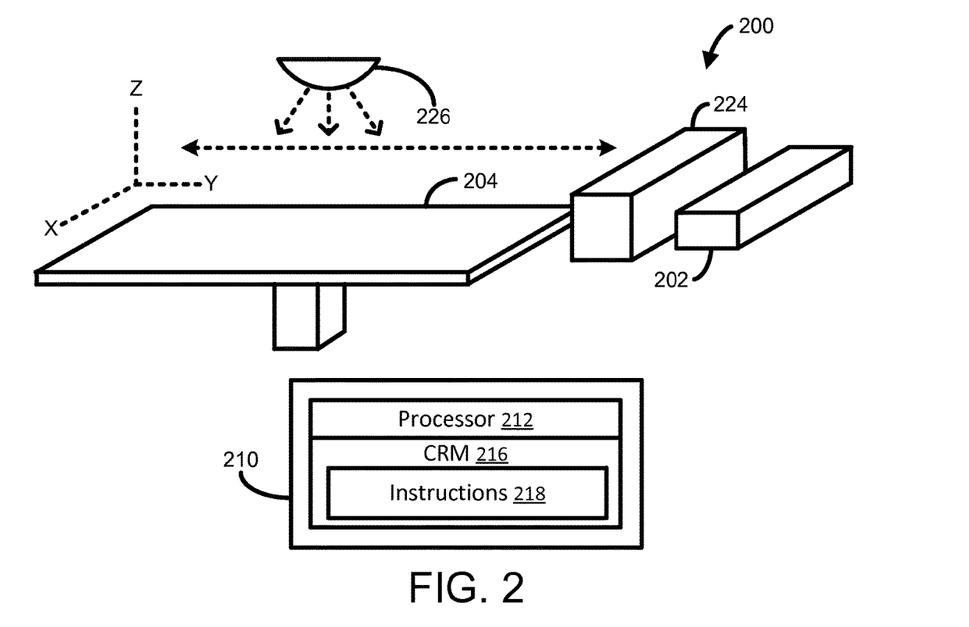
FIG. 2 is a simplified isometric illustration of an additive manufacturing system according to some examples.

FIG. 2 is a simplified isometric illustration of an additive manufacturing system 200 according to some examples. The system 200 may be operated as described further below with reference to the flow diagram of FIG. 3 to generate a three-dimensional object.

In some examples the build material may be a powder-based build material. As used herein the term powder-based materials is intended to encompass both dry and wet powder-based materials, particulate materials, and granular materials. In some examples, the build material may include a mixture of air and solid polymer particles, for example at a ratio of about 40% air and about 60% solid polymer particles. One suitable material may be Nylon 12, which is available, for example, from Sigma-Aldrich Co. LLC. Another suitable Nylon 12 material may be PA 2200 which is available from Electro Optical Systems EOS GmbH. Other examples of suitable build materials may include, for example, powdered metal materials, powdered composite materials, powdered ceramic materials, powdered glass materials, powdered resin material, powdered polymer materials, and the like, and combinations thereof. It should be understood, however, that the examples described herein are not limited to powder-based materials or to any of the materials listed above. In other examples the build material may be in the form of a paste, liquid or a gel. According to one example a suitable build material may be a powdered semi-crystalline thermoplastic material.

The additive manufacturing system 200 may include a system controller 210. Any of the operations and methods disclosed herein may be implemented and controlled in the additive manufacturing system 200 and/or controller 210.

The controller 210 may include a processor 212 for executing instructions that may implement the methods described herein. The processor 212 may, for example, be a microprocessor, a microcontroller, a programmable gate array, an application specific integrated circuit (ASIC), a computer processor, or the like. The processor 212 may, for example, include multiple cores on a chip, multiple cores across multiple chips, multiple cores across multiple devices, or combinations thereof. In some examples, the processor 212 may include at least one integrated circuit (IC), other control logic, other electronic circuits, or combinations thereof.

The processor 212 may be in communication with a computer-readable storage medium (CRM) 216, e.g. via a communication bus. The computer-readable storage medium 216 may include a single medium or multiple media. For example, the computer readable storage medium (CRM) 216 may include one or both of a memory of the ASIC, and a separate memory in the controller 210. The computer readable storage medium (CRM) 216 may be any electronic, magnetic, optical, or other physical storage device. For example, the computer-readable storage medium 216 may be, for example, random access memory (RAM), static memory, read-only memory, an electrically erasable programmable read-only memory (EEPROM), a hard drive, an optical drive, a storage drive, a CD, a DVD, and the like. The computer-readable storage medium 216 may be non-transitory. The computer-readable storage medium 216 may store, encode, or carry computer executable instructions 218 that, when executed by the processor 212, may cause the processor 212 to perform any of the methods or operations disclosed herein according to various examples.

The system 200 may include a coalescing agent distributor 202 to selectively deliver coalescing agent to successive layers of build material provided on a support member 204. According to one non-limiting example, a suitable coalescing agent may be an ink-type formulation comprising carbon black, such as, for example, the ink formulation commercially known as CM997A available from Hewlett-Packard Company. In one example such an ink may additionally comprise an infra-red light absorber. In one example such an ink may additionally comprise a near infra-red light absorber. In one example such an ink may additionally comprise a visible light absorber. In one example such an ink may additionally comprise a UV light absorber. Examples of inks comprising visible light enhancers are dye based colored ink and pigment based colored ink, such as inks commercially known as CM993A and CE042A available from Hewlett-Packard Company.

The controller 210 may control the selective delivery of coalescing agent to a layer of provided build material in accordance with the instructions 218.

The agent distributor 202 may be a printhead, such as a thermal inkjet printhead or a piezo inkjet printhead. The printhead may have arrays of nozzles. In one example, printheads such as those commonly used in commercially available inkjet printers may be used. In other examples, the agents may be delivered through spray nozzles rather than through printheads. Other delivery mechanisms may be used as well. The agent distributor 202 may be used to selectively deliver, e.g. deposit, coalescing agent when in the form of suitable fluids such as a liquid.

The coalescing agent distributor 202 may include a supply of coalescing agent or may be connectable to a separate supply of coalescing agent.

The agent distributor 202 may be used to selectively deliver, e.g. deposit, coalescing agent when in the form of a suitable fluid such as liquid. In some examples, the agent distributor 202 may have an array of nozzles through which the agent distributor 202 is able to selectively eject drops of fluid. In some examples, each drop may be in the order of about 10 pico liters (pl) per drop, although in other examples the agent distributor 202 is able to deliver a higher or lower drop size. In some examples the agent distributor 202 is able to deliver variable size drops.

In some examples the coalescing agent may comprise a liquid carrier, such as water or any other suitable solvent or dispersant, to enable it to be delivered via a printhead.

In some examples the printheads may be drop-on-demand printhead. In other examples the printhead may be continuous drop printhead.

In some examples, the agent distributor 202 may be an integral part of the system 200. In some examples, the agent distributor 202 may be user replaceable, in which case they may be removably insertable into a suitable agent distributor receiver or interface module of the system 200.

In the example illustrated in FIG. 2, the agent distributor 202 may have a length that enables it to span the whole width of the support member 204 in a so-called page-wide array configuration. In one example this may be achieved through a suitable arrangement of multiple printheads. In other examples a single printhead having an array of nozzles having a length to enable them to span the width of the support member 204 may be used. In other examples, the agent distributor 202 may have a shorter length that does not enable it to span the whole width of the support member 204.

The agent distributor 202 may be mounted on a moveable carriage to enable it to move bi-directionally across the length of the support 204 along the illustrated y-axis. This enables selective delivery of coalescing agent across the whole width and length of the support 204 in a single pass. In other examples the agent distributor 202 may be fixed, and the support member 204 may move relative to the agent distributor 202.

In other examples the agent distributors may be fixed, and the support member 204 may move relative to the agent distributors.

It should be noted that the term 'width' used herein is used to generally denote the shortest dimension in the plane parallel to the x and y axes illustrated in FIG. 2, whilst the term 'length' used herein is used to generally denote the longest dimension in this plane. However, it will be understood that in other examples the term 'width' may be interchangeable with the term 'length'. For example, in other examples the agent distributor 202 may have a length that enables them to span the whole length of the support member 204 whilst the moveable carriage may move bi-directionally across the width of the support member 204.

In another example the agent distributor 202 does not have a length that enables it to span the whole width of the support member but are additionally movable bi-directionally across the width of the support member 204 in the illustrated x-axis. This configuration enables selective delivery of coalescing agent across the whole width and length of the support 204 using multiple passes. Other configurations, however, such as a page-wide array configuration, may enable three-dimensional objects to be created faster.

The system 200 may further comprise a build material distributor 224 to provide, e.g. deliver and/or deposit, successive layers of build material on the support member 204. Suitable build material distributors 224 may include, for example, a wiper blade and a roller. Build material may be supplied to the build material distributor 224 from a hopper or build material store. In the example shown the build material distributor 224 moves across the length (y-axis) of the support member 204 to deposit a layer of build material. As previously described, a layer of build material will be deposited on the support member 204, whereas subsequent layers of build material will be deposited on a previously deposited layer of build material. The build material distributor 224 may be a fixed part of the system 200, or may not be a fixed part of the system 200, instead being, for example, a part of a removable module. In some examples, the build material distributor 224 may be mounted on a carriage.

In some examples, the thickness of each layer may have a value selected from the range of between about 50 to about 300 microns, or about 90 to about 110 microns, or about 250 microns, although in other examples thinner or thicker layers of build material may be provided. The thickness may be controlled by the controller 210, for example based on the instructions 218.

In some examples, there may be any number of additional agent distributors and build material distributors relative to the distributors shown in FIG. 2. In some examples, the distributors of system 200 may be located on the same carriage, either adjacent to each other or separated by a short distance. In other examples, two or more carriages each may contain a distributor. For example, each distributor may be located in its own separate carriage. Any additional distributors may have similar features as those discussed earlier with reference to the coalescing agent distributor 202. However, in some examples, different agent distributors may deliver different coalescing agents and/or coalescence modifier agents, for example.

In the example shown the support 204 is moveable in the z-axis such that as new layers of build material are deposited a predetermined gap is maintained between the surface of the most recently deposited layer of build material and lower surface of the agent distributor 202. In other examples, however, the support 204 may not be movable in the z-axis and the agent distributor 202 may be movable in the z-axis.

The system 200 may additionally include an energy source 226 to apply energy to build material to cause the solidification of portions of the build material according to where coalescing agent has been delivered or has penetrated. In some examples, the energy source 226 is an infra-red (IR) radiation source, near infra-red radiation source, halogen radiation source, or a light emitting diode. In some examples, the energy source 226 may be a single energy source that is able to uniformly apply energy to build material deposited on the support 204. In some examples, the energy source 226 may comprise an array of energy sources.

In some examples, the energy source 226 is configured to apply energy in a substantially uniform manner to the whole surface of a layer of build material. In these examples the energy source 226 may be said to be an unfocused energy source. In these examples, a whole layer may have energy applied thereto simultaneously, which may help increase the speed at which a three-dimensional object may be generated.

In other examples, the energy source 226 is configured to apply energy in a substantially uniform manner to a portion of the whole surface of a layer of build material. For example, the energy source 226 may be configured to apply energy to a strip of the whole surface of a layer of build material. In these examples the energy source may be moved or scanned across the layer of build material such that a substantially equal amount of energy is ultimately applied across the whole surface of a layer of build material.

In some examples, the energy source 226 may be mounted on the moveable carriage 203a or 203b.

In other examples, the energy source 226 may apply a variable amount of energy as it is moved across the layer of build material, for example in accordance with instructions 218. For example, the controller 210 may control the energy source only to apply energy to portions of build material on which coalescing agent has been applied.

In further examples, the energy source 226 may be a focused energy source, such as a laser beam. In this example the laser beam may be controlled to scan across the whole or a portion of a layer of build material. In these examples the laser beam may be controlled to scan across a layer of build material in accordance with agent delivery control data. For example, the laser beam may be controlled to apply energy to those portions of a layer of on which coalescing agent is delivered.

The combination of the energy supplied, the build material, and the coalescing agent may be selected such that, excluding the effects of any coalescence bleed: i) portions of the build material on which no coalescing agent have been delivered do not coalesce when energy is temporarily applied thereto; ii) portions of the build material on which only coalescing agent has been delivered or has penetrated coalesce when energy is temporarily applied thereto do coalesce.

Although not shown in FIG. 2, in some examples the system 200 may additionally comprise a pre-heater to maintain build material deposited on the support member 204 within a predetermined temperature range. Use of a pre-heater may help reduce the amount of energy that has to be applied by the energy source 226 to cause coalescence and subsequent solidification of build material on which coalescing agent has been delivered or has penetrated.

Figure 3:
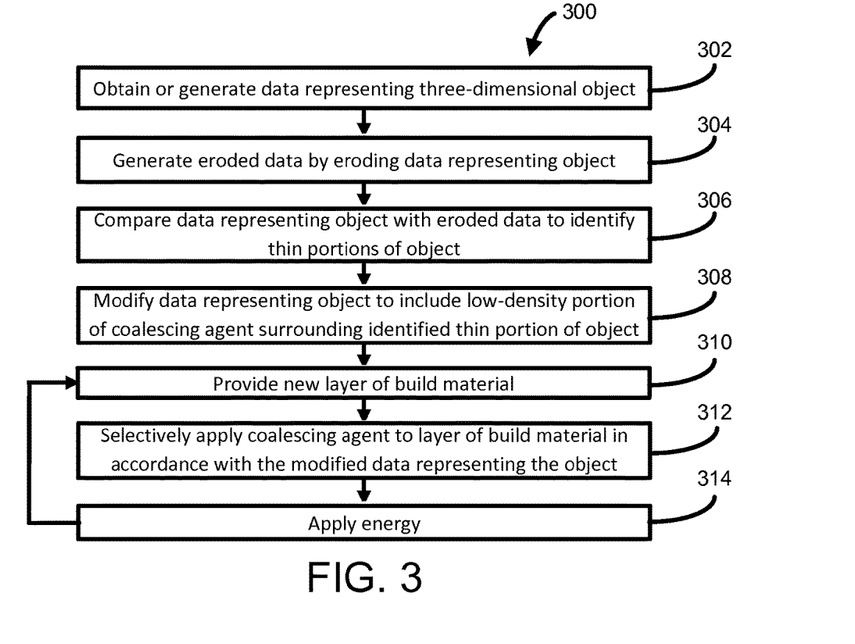
FIG. 3 is a flow diagram illustrating a method of generating a three-dimensional object according to some examples.

FIG. 3 is a flow diagram illustrating a method 300 of generating a three-dimensional object according to some examples. In some examples, the orderings shown may be varied, some elements may occur simultaneously, some elements may be added, and some elements may be omitted.

Figure 4A:
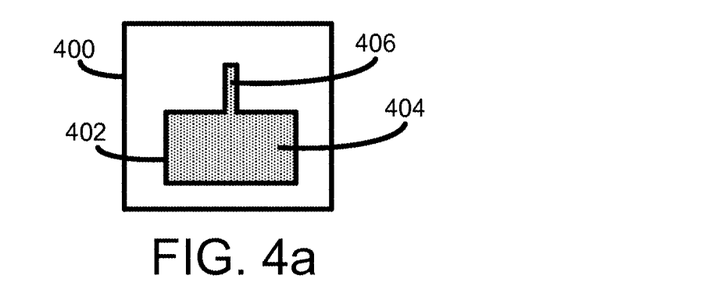
FIGS. 4a-c show data representing a three-dimensional object according to some examples.
Figure 4B:
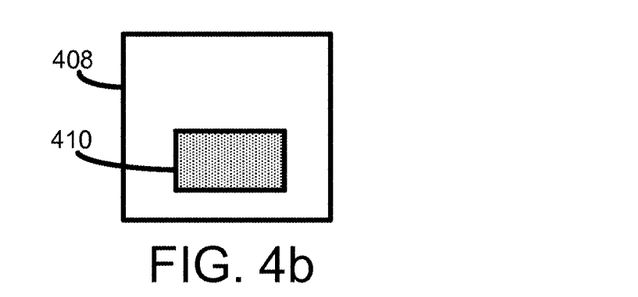
Figure 4C:
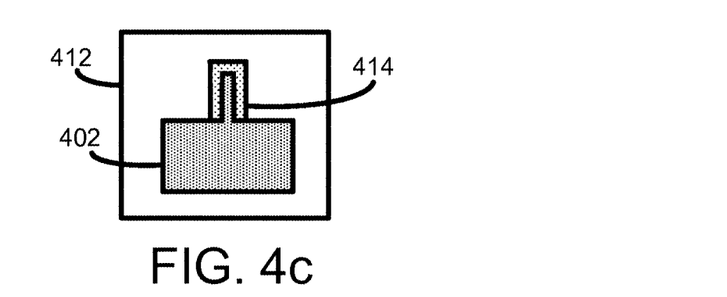
Figure 5A:
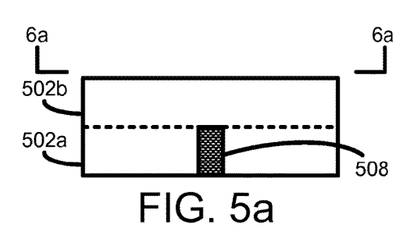
FIGS. 5a-d show a series of cross-sectional side views of layers of build material according to some examples.
Figure 5B:
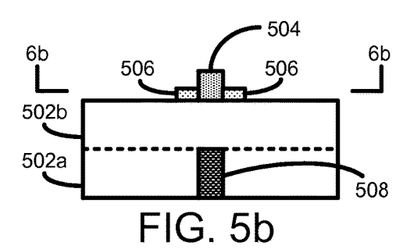
Figure 5C:
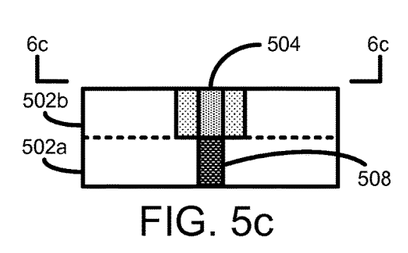
Figure 5D:
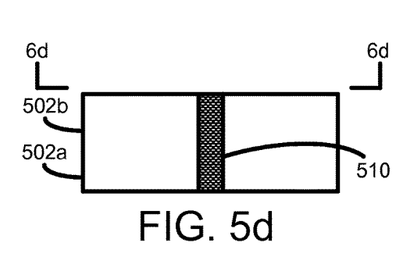
Figure 6A:
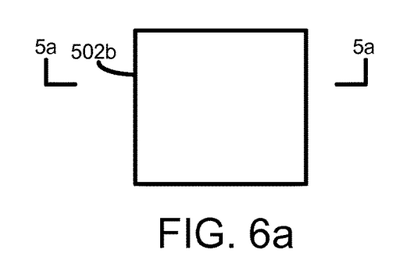
FIGS. 6a-d show a series of top views of layers of build material according to some examples.
Figure 6B:
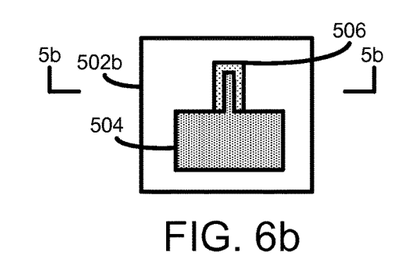
Figure 6C:
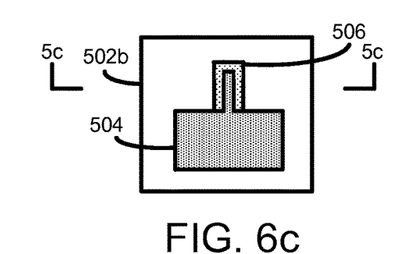
Figure 6D:
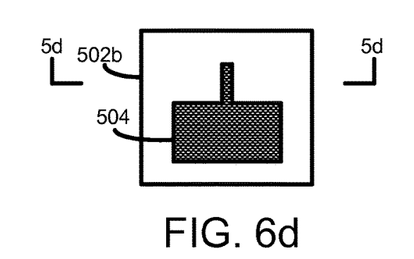

In describing FIG. 3, reference will be made to FIGS. 2, 4a-c, 5a-d, and 6a-d. FIGS. 4a-c show data representing a three-dimensional object according to some examples. FIGS. 5a-d show a series of cross-sectional side views of layers of build material according to some examples. FIGS. 6a-d show a series of top views of layers of build material according to some examples. A top view of layers along line 6a-6a of FIG. 5a is shown in FIG. 6a, and a cross sectional side view along lines 5a-a of FIG. 6a is shown in FIG. 5a. A top view of layers along line 6b-6b of FIG. 5b is shown in FIG. 6b, and a cross sectional side view along lines 5b-b of FIG. 6b is shown in FIG. 5b. A top view of layers along line 6c-6c of FIG. 5c is shown in FIG. 6c, and a cross sectional side view along lines 5c-c of FIG. 6c is shown in FIG. 5c. A top view of layers along line 6d-6d of FIG. 5d is shown in FIG. 6d, and a cross sectional side view along lines 5d-d of FIG. 6a is shown in FIG. 5d.

At 302, data 400 representing the three dimensional object may be generated or obtained by the controller 210. "Data representing the three dimensional object" is defined herein to include any data defining the object from its initial generation as three dimensional object design data to its conversion into slice data representing slices of the object to be generated. The data 400 may be part of the instructions 218.

The three-dimensional object design data may represent a three-dimensional model of an object to be generated, and/or properties of the object (e.g. density, surface roughness, strength, and the like). The model may define the solid portions of the object. The three-dimensional object design data may be received, for example, from a user via an input device 220, as input from a user, from a software driver, from a software application such as a computer aided design (CAD) application, or may be obtained from a memory storing default or user-defined object design data and object property data. The three-dimensional object design data may be processed by a three-dimensional object processing system to generate slice data representing slices of parallel planes of the model.

Each slice may define a portion of a respective layer of build material that is to be solidified by the additive manufacturing system. The slice data may undergo transformations from (1) vector slice data representing slices of the object in a vector format, to (2) contone slice data representing slices of the object in a bitmap or rasterized format, to (3) halftone slice data representing locations or patterns in which drops of agent are to be deposited on a layer of build material for each slice of the object, to (4) mask slice data representing the timing of when drops of agent are to be deposited in locations, portions, or patterns on a layer of build material for each slice of the object, e.g. using nozzles of an agent distributor.

In the example of FIG. 4a, an example of data 400 is shown as slice data having a slice 402 of the object to be generated. The slice 402 may include a thick portion 404. A thick portion is a portion that does not have a thickness across its axes (e.g. width or length) that is less than a threshold thickness. The slice 402 may include a thin portion 406. A thin portion is a portion that has a thickness across at least one axis (e.g. width or length) that is below the threshold thickness. In some examples, the threshold thickness may be 2 millimeters, or may be 1 millimeter.

In some examples, thin portions of slices may be more susceptible to under-solidification than thick portions of slices due to heat dissipation from the thin portion to surrounding build material, as discussed earlier. Therefore, the data 400 may be processed at 304 to 308 to add a portion 414 (as shown in FIG. 4c) in which a lower density or amount of coalescing agent is to be delivered relative to the density or amount of coalescing agent to be delivered to generate the slice 402. The portion 414 may surround the boundary (e.g. external boundary) of any thin portions, e.g. thin portion 406.

In some examples, rather than adding the portion 414 around the boundary of thin portions, the portion 414 may be added around the entire circumferential boundary of the entire slice including thin and thick portions, such that the portion 414 completely surrounds the slice 402.

The method 300 at 304 to 308 describes the data 400 being processed, but in other examples other types of data may be processed at 304 to 308 including three-dimensional object design data or any other type of slice data. In addition, if slice data is processed at 304 to 308, then all slice data (representing multiple slices of the objet) of a print job may be processed.

At 304, the controller 210 may erode the data 400 to generate eroded data 408 as shown in FIG. 4b. The erosion may involve eroding (e.g. shrinking) the boundaries of the slice 402 in the data 400 by a predetermined eroding distance. In some examples, the eroding distance may be equal to half the threshold thickness used to identify thin portions. For example, if the threshold thickness is 2 millimeters, then the eroding distance may be 1 millimeter. Thus, for example, once the slice 402 is eroded, any thin portion that is below the threshold thickness (e.g. 2 millimeters) may be removed in the eroded data 408 because eroding both of opposite-facing boundaries by the eroding distance (e.g. 1 millimeter) may erode a thin portion by the threshold thickness of e.g. 2 millimeters. In FIG. 4b, the eroded slice 410 is shown with no thin portions (e.g. the thin portion 406 is removed), while retaining an eroded thick portion 410 derived from the thick portion 404.

At 306, the controller 210 may compare the data 400 and eroded data 402 to identify any thin portions in the data 400 e.g. the thin portion 406. This may be done by checking which portions of the data 400 have been removed completely in the eroded data 402. Thus, for example, the controller 210 may identify the thin portion 402 as having been removed by the erosion.

At 308, the controller 210 may modify the data 400 to generate modified data 412. In addition to including the slice 402 of data 400, the modified data 412 may include portion 414 in which a lower density or amount of coalescing agent is to be delivered relative to the density or amount of coalescing agent to be delivered to generate the slice 402. The portion 414 may surround the boundary of the thin portion 406. The modification may be done by dilating the identified thin portion 406 (or in examples where the entire slice is to be surrounded by the portion 414, the entire slice 402 may be dilated). The dilation may involve dilating (e.g. expanding) the boundaries of the thin portion 406 (or entire slice 402 if the entire slice 402 is to be surrounded by the portion 414) by a predetermined dilating distance. In some examples, the dilating distance may be equal to about 0.1 millimeters to about 10 millimeters. The dilating distance may correspond to the width of the portion 414 adjacent to the thin portion 406. In some examples, the dilating distance may depend on the thickness or the portion (e.g. thin portion). For example, a first thin portion of the object that is thinner than a second thin portion of the object may be dilated to a greater dilating distance than the second thin portion. Once dilation of complete, the modified data 412 may be compared to the data 400 to identify the newly added portion. The newly added portion may be designed as the portion 414 in which a lower density or amount of coalescing agent is to be delivered.

As discussed earlier, if slice data is processed at 304 to 308, the processing of 304 to 308 may be performed for all slice data (representing multiple slices of the object) of a print job. In some examples, slice data representing separate slices may be processed during printing in 310 to 314, e.g. slice data representing the particular slice to be printed in the particular iteration of 310 to 314 may be processed e.g. before applying the agent at 312.

At 310, a layer 502b of build material may be provided, as shown in FIGS. 5a and 6a. For example, the controller 210 may control the build material distributor 224 to provide the layer 502b on a previously completed layer 502a on the support member 204 by causing the build material distributor 224 to move along the y-axis as discussed earlier. The completed layer 502a may include a solidified portion 506. Although a completed layer 502a is shown in FIGS. 5a-d for illustrative purposes, it is understood that 310 to 314 may initially be applied to generate the first layer 502a.

In some examples, after applying the layer 502b, the layer 502b of build material may be heated by the heater to heat and/or maintain the build material within a predetermined temperature range. The predetermined temperature range may, for example, be below the temperature at which the build material would experience bonding in the presence of coalescing agent 504. For example, the predetermined temperature range may be between about 155 and about 160 degrees Celsius, or the range may be centered at about 160 degrees Celsius. Pre-heating may help reduce the amount of energy that has to be applied by the energy source 226 to cause coalescence and subsequent solidification of build material on which coalescing agent has been delivered or has penetrated.

At 312, as shown in FIGS. 5b and 6b, coalescing agent 504 and 506 may be selectively delivered in patterns to the surface of portions of the layer 502b in accordance with the modified data 412. As discussed earlier, the agent 504 and 506 may be delivered by agent distributor 202, for example in the form of fluids such as liquid droplets. "Selective delivery" means that agent may be delivered to selected portions of the surface layer of the build material in various patterns.

The modified data 412 may include slice 402 defining a slice that is to become solid to form part of the three-dimensional object being generated using coalescing agent 504, as shown in FIGS. 5b and 6b. In some examples, to form the slice the coalescing agent 504 is to be delivered at a density or amount sufficient to cause coalescence and solidification of build material upon application of energy, e.g. due to the coalescing agent 504 acting as an absorber of applied energy to facilitate the coalescence and solidification. In some examples, the agent distributor 202 may be to deliver drops of coalescing agent 504 at a density of between about 0.5 to 2 drops (e.g. 1 drop) per $1/600 \times 1/600$ inch region ($1/360000$ square inches). Each drop may have a mass of about 5 nanograms to about 20 nanograms. In other examples the agent distributor 202 may be to deliver drops of coalescing agent 504 at a higher or lower density sufficient to achieve coalescence and solidification.

The modified data 412 may also include portion 414 defining a lower density or amount of coalescing agent 506 to be delivered relative to the density or amount of coalescing agent 504 to be delivered to generate the slice defined by slice 402 of modified data 412. The low density coalescing agent 506 may be delivered in pattern surrounding the boundary of the thin portion generated using the coalescing agent 504. In some examples, the coalescing agent 506 may act as an absorber of applied energy, and the lower density of the coalescing agent 506 relative to the coalescing agent 504 may have the following effects. The build material on which the coalescing agent 506 is applied may not coalesce and solidify upon application of energy, or may minimally coalesce and solidify such that any slightly solidified portions may not form a permanent part the object being generated (e.g. the slightly solidified portions may be shaken off the formed object). Thus, the density of coalescing agent 506 may be insufficient to achieve full solidification in the second portion when energy is applied. Additionally, the build material on which coalescing agent 506 is applied may prevent at least some heat from flowing away from the thin portion 414 of the slice generated by applying coalescing agent 504 on the build material. This may be due to a reduced thermal gradient between the portions having coalescing agent 504 and portions having coalescing agent 506, due to the portion having coalescing agent 506 being closer to the temperature of the portions having coalescing agent 504 than would be the case compared to if the coalescing agent 506 were not applied. In some examples, the agent distributor 202 may, for example, be to deliver drops of coalescing agent 506 at a density of between about $1/128$ to $1/32$ drops (e.g. $1/64$ drops) per $1/600 \times 1/600$ inch region ($1/360000$ square inches). Each drop may have a mass of about 5 nanograms to about 20 nanograms. In some examples, the density of coalescing agent 506 to be delivered may be at least an order of magnitude less than the density of coalescing agent 504 to be delivered. In some examples, the density of the coalescing agent 506 may depend on the thickness or the portion (e.g. thin portion). For example, a first thin portion of the object that is thinner than a second thin portion of the object may be have a surrounding portion of coalescing agent 506 of a greater density than a density of coalescing agent of a surrounding portion of the second thin portion.

In other examples the agent distributor 202 may be to deliver drops of coalescing agent 506 at a higher or lower density sufficient to cause no or minimal solidification where coalescing agent 506 is delivered but to prevent at least some heat from flowing away from the thin portion 414.

In some examples, the same coalescing agent distributor 202 may be to deliver the different densities of coalescing agent 504 and 506, but in other examples, different coalescing agent distributors may be to deliver the different densities of coalescing agent 504 and 506.

In some examples, coalescence modifier agent may similarly be selectively delivered in patterns to portions of the layer 502b surrounding the portions having low density coalescing agent 506. In some examples, coalescence modifier agent may also be selectively delivered in patterns to a portion of the layer 502b surrounding thick portions of the slice having higher density coalescing agent 504. The coalescence modifier agent may be to reduce coalescence bleed, which is solidification of portions of the build material that are not intended to be solidified. Coalescence bleed may result, for example, in a reduction in the overall accuracy of generated three-dimensional objects.

FIGS. 5c and 6c show coalescing agent 504 and 506 having penetrated substantially completely into the portions of the layer 502b of build material, but in other examples, the degree of penetration may be less than 100%. The degree of penetration may depend, for example, on the quantity of agent delivered, on the nature of the build material, on the nature of the agent, etc.

At 314, a predetermined level of energy may be temporarily applied to the layer 502b of build material. In various examples, the energy applied may be infra-red or near infra-red energy, microwave energy, ultra-violet (UV) light, halogen light, ultra-sonic energy, or the like. In some examples, the energy source may be focused. In other examples, the energy source may be unfocused. The temporary application of energy may cause the portions of the build material on which the higher density of coalescing agent 504 was delivered to heat up above the melting point of the build material and to coalesce, and may cause the portions of build material on which the lower density of coalescing agent 506 was delivered to not coalesce or minimally coalesce. For example, the temperature of some or all of the layer 502b may achieve about 220 degrees Celsius. Upon cooling, the portions having coalescing agent 504 may coalesce may become solid and form part of the three-dimensional object being generated, as shown in FIG. 5d and FIG. 6d.

As discussed earlier, one such solidified portion 508 may have been generated in a previous iteration. The heat absorbed during the application of energy may propagate to the previously solidified portion 508 to cause part of portion 508 to heat up above its melting point. This effect helps creates a portion 510 that has strong interlayer bonding between adjacent layers of solidified build material, as shown in FIG. 5d. The portions having coalescing agent 504 may also achieve good object properties such as strength, good surface properties, accuracy, strength, and inter-layer bonding, as a result of the portions having coalescing agent 506 acting to prevent at least some heat from flowing away from the portions having coalescing agent 504.

After a layer of build material has been processed as described above in 310 to 314, new layers of build material may be provided on top of the previously processed layer of build material. In this way, the previously processed layer of build material acts as a support for a subsequent layer of build material. The process of 310 to 314 may then be repeated to generate a three-dimensional object layer by layer.

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

The invention claimed is:

1. A system for generating a three-dimensional object, the system comprising:
at least one agent distributor to selectively deliver coalescing agent onto portions of a layer of build material at a first density and at a second density lower than the first density; and
a controller to control the agent distributor to selectively deliver the coalescing agent at the first and second densities onto respective first and second portions of the layer in respective first and second patterns derived from data representing the three-dimensional object to be generated, so that when energy is applied to the layer the build material is to coalesce and solidify to form a slice of the three-dimensional object in accordance with the first pattern, wherein the second portion is disposed around a boundary of the first portion, wherein presence of the coalescing agent in the second portion is to prevent at least some heat from flowing away from the first portion when the energy is applied,
wherein the first portion comprises a thin portion that is less than a threshold thickness and a thick portion that is greater than the threshold thickness,
wherein the boundary surrounds at least the thin portion such that the second portion is to be disposed around the boundary of the thin portion.

2. The system of claim 1 wherein the second density is insufficient to achieve full solidification in the second portion when the energy is applied.

3. The system of claim 1 wherein the second density is selected based on a thickness of the first portion.

4. The system of claim 1 wherein a thickness of the second portion is selected based on a thickness of the first portion.

5. The system of claim 1 wherein the second density is at least an order of magnitude less than the first density.

6. The system of claim 1 wherein the first density is between about 0.5 to 2 drops of coalescing agent per $1/360000$ square inches, wherein the second density is between about 1/128 and 1/32 drops of coalescing agent per 1/360000 square inches.

7. The system of claim 1 wherein the second portion is not to be disposed around a second boundary of the thick portion.

8. The system of claim 1 wherein the boundary is an entire circumferential boundary of the first portion such that the second portion is to completely surround by the first portion.

9. The system of claim 1 further comprising a coalescence modifier agent distributor to selectively deliver a coalescence modifier agent onto portions of the layer of build material, wherein the controller is to control the coalescence modifier agent distributor to selectively deliver the coalescence modifier agent onto a third portion of the layer in a third pattern derived from the data representing the object to be generated, wherein the third portion is disposed around a boundary of the second portion, so that when energy is applied to the layer, coalescence in the third portion is reduced or prevented.

10. The system of claim 1 wherein the controller is to modify data representing the three-dimensional object to comprise the second portion, and to subsequently control the distributor to selectively deliver the coalescing agent onto the second portion in the second pattern derived from the data as modified.

11. The system of claim 10 wherein the controller is to modify the data by:
eroding the first portion in the data representing the object to generate eroded data;
comparing the data representing the object to the eroded data to identify a thin portion of the first portion that is removed in the eroded data; and
dilating the data representing the object to comprise the second portion in the data.

12. A method comprising:
delivering a layer of build material;
selectively depositing coalescing agent to a first portion of the layer at a first density;
selectively depositing coalescing agent to a second portion of the layer at a second density lower than the first density, the second portion disposed around a boundary of the first portion; and
applying energy to the layer to cause the first portion to coalesce and solidify to form a slice of a three-dimensional object, wherein presence of the coalescing agent in the second portion prevents at least some heat from flowing away from the first portion when the energy is applied,
wherein the first portion defines data representing a three-dimensional object to be generated and the second portion defines portions of the build material that does not form part of the three-dimensional object.

13. The method of claim 12, wherein:
the first portion comprises a thin portion that is less than a threshold thickness and a thick portion that is greater than the threshold thickness, and
the boundary is of the thin portion such that the second portion is to be disposed around the boundary of the thin portion.

14. The method of claim 12, wherein the second density is insufficient to achieve full solidification in the second portion when the energy is applied.

15. The method of claim 12, wherein the second density is selected based on a thickness of the first portion.

16. A non-transitory computer readable storage medium comprising executable instructions that, when executed by a processor, cause the processor to:
obtain data representing a three-dimensional object to be generated, the data including a first portion defining where coalescing agent is to be delivered at a first density;
modify the data to include a second portion on which coalescing agent is to be delivered at a second density less than the first density, the second portion surrounding at least part of the first portion; and
using the modified data, control at least one agent distributor to deliver the coalescing agent to the first portion at a first density and to the second portion at a second density such that the first portion is to coalesce and solidify when energy is applied, wherein the second density is insufficient to achieve full solidification in the second portion when the energy is applied, and wherein presence of the coalescing agent in the second portion prevents heat from flowing away from the first portion when the energy is applied,
wherein the first portion defines data representing a three-dimensional object to be generated and the second portion defines portions of the build material that does not form part of the three-dimensional object.

17. The computer readable storage medium of claim 16, comprising executable instructions that, when executed by the processor, cause the processor to:
modify data representing the three-dimensional object to include the second portion; and
control the agent distributor to selectively deliver the coalescing agent onto the second portion in the second pattern derived from the data as modified,
wherein control the agent distributor to selectively deliver the coalescing agent onto the second portion in the second pattern derived from the data as modified comprises:
eroding the first portion in the data representing the object to generate eroded data;
comparing the data representing the object to the eroded data to identify a thin portion of the first portion that is removed in the eroded data; and
dilating the data representing the object to include the second portion in the data.

18. The computer readable storage medium of claim 16, comprising executable instructions that, when executed by the processor, cause the processor to:
instruct a coalescence modifier agent distributor to selectively deliver a coalescence modifier agent onto portions of the layer of build material,
wherein the controller is to control the coalescence modifier agent distributor to selectively deliver the coalescence modifier agent onto a third portion of the layer in a third pattern derived from the data representing the object to be generated, and
wherein the third portion is disposed around a boundary of the second portion, so that when energy is applied to the layer, coalescence in the third portion is reduced.

19. The computer readable storage medium of claim 16, wherein the first portion comprises a thin portion that is less than a threshold thickness and a thick portion that is greater than the threshold thickness.

20. The computer readable storage medium of claim 19, wherein the boundary surrounds at least the thin portion such that the second portion is to be disposed around the boundary of the thin portion.

* * * * *